(No Model.)
R. E. BOSCHERT.
FRICTION CLUTCH.
No. 392,848. Patented Nov. 13, 1888.
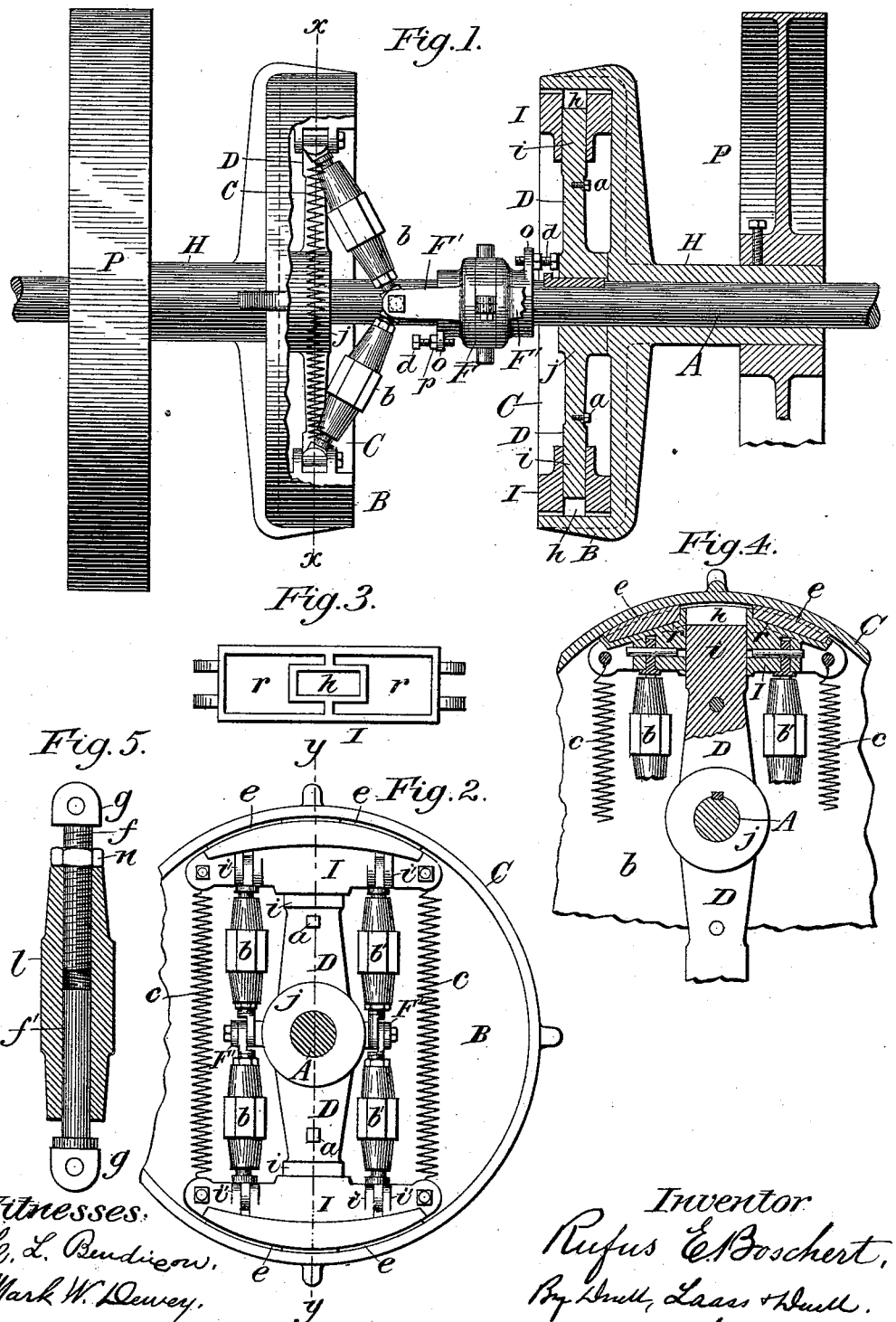

UNITED STATES PATENT OFFICE.

RUFUS E. BOSCHERT, OF SYRACUSE, NEW YORK.

FRICTION-CLUTCH.

SPECIFICATION forming part of Letters Patent No. 392,843, dated November 13, 1888.

Application filed April 20, 1888. Serial No. 271,360. (No model.)

*To all whom it may concern:*

Be it known that I, RUFUS E. BOSCHERT, of Syracuse, in the county of Onondaga, in the State of New York, have invented new and useful Improvements in Friction-Clutches, of which the following, taken in connection with the accompanying drawings, is a full, clear, and exact description.

This invention relates to the class of friction-clutches in which the clutch-shoes or friction-blocks are moved radially into and out of contact with the inner circumferential face of a wheel or pulley mounted loosely on the shaft; and the invention consists in an improved construction and combination of parts constituting a friction-clutch of superior efficiency.

In the annexed drawings, Figure 1 is partly a side view and partly a sectional view of a duplex clutch embodying my improvements, the wheel at the right hand of said figures being a transverse section on line $y\,y$, Fig. 2. Fig. 2 is a face view of the clutch. Fig. 3 is a top plan view of the clutch-shoe. Fig. 4 is partly a transverse section on line $x\,x$, Fig. 1; and Fig. 5 is an enlarged longitudinal section of one of the toggle-arms.

Similar letters of reference indicate corresponding parts.

B B represent two clutch pulleys or wheels mounted loosely on the shaft A. Each of said wheels is provided with a prolonged hub, H, to which is rigidly secured the gear wheel or pulley P, by which motion is to be transmitted to the shaft through the medium of the clutch.

F denotes the shifting collar mounted loosely on the shaft A between the two clutch-wheels B B, and the latter are each provided on the side facing the aforesaid shifting collar with an annular flange, C, concentric with the shaft. Adjacent to the wheel B is a hub, $j$, rigidly fastened to the shaft, and from this hub extend radially the driving-arms D D, disposed diametrically opposite each other. Each of said arms is formed with a straight end, $i$, on which slides one of the clutch-shoes, I, which for that purpose has the mortise $h$ extending through it and of approximately the same size as the end portion, $i$, of the aforesaid arm, which is inserted in said mortise. Stops $a\,a$, projecting from the sides of the arms D D, limit the motion of the clutch-shoes toward the shaft A. The outer peripheral face of the clutch-shoe I form with recesses $r\,r$, in which I secure the friction-blocks $e\,e$, preferably composed of wood. The two clutch-shoes I I in each wheel B are drawn toward the shaft by springs $c\,c$, which may be connected at one end to the driving-arms, but are preferably connected at opposite ends to the two brake-shoes, so as to connect them together. Said springs serve to prevent the clutch-shoes from being thrown out and into contact with the inner peripheral face of the wheel by centrifugal force when the shaft is in motion and the clutch-shoes are relieved from the pressure of the toggle-arms.

The shifting collar is formed with horns F' F' at opposite sides of the shaft, which horns are connected with the two sets of clutch-shoes I I I I by two sets of toggle-arms, $b\,b\,b\,b$ and $b'\,b'\,b'\,b'$, each set being arranged in pairs, and each pair being connected at one end in common to one of the horns, and at the opposite end to one of the end portions of the clutch-shoes in one of the clutch-pulleys, and thus the latter is operated by two toggle-arms pressing on the two end portions thereof when setting the shoe in frictional contact with the clutch wheel or pulley. This distributes the strain on the clutch-shoe, and therefore the latter can be made longer than ordinary clutch-shoes and the efficiency and durability of the clutch-shoe are proportionately increased, and by pivoting each pair of toggle-arms in common to the shifting collar in the manner aforesaid, and as illustrated in the annexed drawings, the lateral strain upon the horn F' from one toggle-arm is counteracted by the strain from the other toggle-arm, and this arrangement also permits the use of longer toggle-arms and affords better purchase for the same.

In order to obviate cramping and binding the clutch-shoes, I connect the toggle-arms to the said shoes at points central of the width of the frictional bearings thereof. The clutch is operated by shifting the collar toward one of the wheels B. The toggle-arms which lean toward said wheel are thereby caused to crowd the clutch-shoes I I into frictional contact with the inner face of the flange C of said wheel, and thus compel the shaft to rotate with the wheel.

In order to relieve the shifting collar F from the draft toward either wheel B by the centrifugal force exerted on the clutch-shoes in said wheel when the opposite clutch-shoes are thrown into operation, I provide the central portion of the toggle-arm with a longitudinal slip-joint by forming one of the end portions of the toggle-arm of a screw-threaded stem, $f$, which is provided with an eye, $g$, by which to connect it either to the horn F' of the shifting collar or to ears $i'$ $i'$ on the clutch-shoe. I prefer, however, to connect it to the aforesaid horn, as shown in the annexed drawings. This stem $f$ is screwed into one end of a sleeve, $l$, which portion of the sleeve is screw-threaded for that purpose. The remainder of the interior of the sleeve is smooth and in this slides a smooth stem, $f'$, the outer end of which is provided with an eye, $g$, which is connected to the ears $i'$ $i'$ on the clutch-shoe I by a bolt passing through said parts. To the screw-threaded stem $f$ at the end of the sleeve $l$, I prefer to connect a jam-nut, $n$, to retain the sleeve in its adjusted position on the said stem. In shifting the collar F toward one of the wheels B B the toggle-arms which extend toward the other of said wheels allow the clutch-shoes I I in the latter wheel to be drawn toward the shaft by the spring $c$ $c$ until said clutch-shoes are arrested by the stops $a$ $a$, and then the said toggle-arms become distended until the other set of toggle-arms have brought the thereto connected clutch-shoes into binding contact with the wheel B.

It will be observed that by arresting the clutch-shoes, as aforesaid, the toggle-arms connected therewith are sustained at a proper angle of inclination to allow them to be easily forced outward by the sliding of the shifting collar F toward the wheel containing the clutch-shoes I I, with which said toggle-arms are connected. The toggle-arms are designed to move slightly beyond a plane parallel with the driving-arms D, so as to lock them in their operative position; and in order to regulate the thrust of the toggle-arms, so as to permit the unlocking of the clutch with more or less ease, I connect to the shifting collar F stops $d$ $d$, preferably of the form of set-screws working in lugs $o$ $o$, projecting from the collar F, said set-screws projecting from the shifting collar F, so as to collide with the sides of the hubs of the arms D D during the shifting of said collar. Said set-screws are adjustable in their projections, and by jam-nuts $p$, connected to the set-screws, they are maintained in their adjusted position.

I do not limit myself to the construction of the clutch-wheels B B as shown in the annexed drawings, as it is obvious that a clutch-flange may be formed on or attached to the pulley P or any other kind of wheel.

What I claim as my invention is—

1. In combination with the shaft, two clutch pulleys or wheels, and the shifting collar between said pulleys or wheels, driving-arms fastened to the shaft in the clutch pulleys or wheels, clutch-shoes sliding on said arms, stops on the arms limiting the movement of the clutch-shoes, and two sets of toggle-arms, each individual toggle-arm connected at one end to one of the clutch-shoes and at the opposite end with the shifting collar and provided intermediate of its length with the longitudinal slip-joint, substantially as and for the purpose specified.

2. In combination with the clutch pulley or wheel, clutch-shoes disposed diametrically opposite each other, and the shifting collar on the shaft, toggle-arms arranged in pairs, respectively, at opposite sides of the shaft, and each pair pivoted in common to the shifting collar at a point diametrically opposite the pivotal attachment of the other pair, and the outer ends of the two pairs of toggles being connected to the two clutch-shoes near the ends thereof, substantially as described and shown.

3. In combination with the clutch pulleys or wheels, shifting collar between said pulleys or wheels, and driving-arms in the latter, clutch-shoes sliding on said driving-arms, toggle-arms connecting the shifting collar with the clutch-shoes and provided with slip-joints, springs arranged to draw the clutch-shoes toward the shaft, and stops on the driving-arms to arrest the inward movement of the clutch-shoes.

4. In combination with the clutch pulley or wheel B, driving-arm D, clutch-shoes I I, shifting collar F, and toggle-arms $b$ $b$, connecting said collar with the clutch-shoes, and the set-screw $d$ for limiting the movement of the shifting collar, substantially as described and shown.

5. The toggle-arms $b$, composed of the screw-threaded stem $f$, sleeve $l$, screw-threaded in one of its end portions and screwed onto the said stem, and the smooth stem $f''$, sliding in the opposite end of said sleeve, substantially as described and shown.

In testimony whereof I have hereunto signed my name, in the presence of two witnesses, at Syracuse, in the county of Onondaga, in the State of New York, this 18th day of April, 1888.

RUFUS E. BOSCHERT. [L. S.]

Witnesses:
 MARK W. DEWEY,
 C. L. BENDIXON.